US008849107B2

(12) United States Patent
Nomura et al.

(10) Patent No.: US 8,849,107 B2
(45) Date of Patent: Sep. 30, 2014

(54) ELECTRICAL DRIVE DEVICE FOR BENDING PHOTOGRAPHING OPTICAL SYSTEM

(71) Applicant: Hoya Corporation, Tokyo (JP)

(72) Inventors: Hiroshi Nomura, Saitama (JP); Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 14/155,599

(22) Filed: Jan. 15, 2014

(65) Prior Publication Data

US 2014/0212119 A1 Jul. 31, 2014

(30) Foreign Application Priority Data

Jan. 31, 2013 (JP) ................................. 2013-016628

(51) Int. Cl.
*G03B 3/10* (2006.01)
*G03B 13/34* (2006.01)
*H04N 5/225* (2006.01)

(52) U.S. Cl.
CPC ...................................... *G03B 13/34* (2013.01)
USPC .......................................... 396/133; 348/340

(58) Field of Classification Search
CPC .. G03B 17/12; G03B 17/17; G03B 2217/002; G03B 2205/0046; H04N 5/2252
USPC ........... 396/133, 349, 529; 348/340; 359/819, 359/823, 824
See application file for complete search history.

(56) References Cited

U.S. PATENT DOCUMENTS

2012/0075518 A1* 3/2012 Okuda .......................... 348/340

FOREIGN PATENT DOCUMENTS

JP 2007-121494 5/2007

OTHER PUBLICATIONS

U.S. Appl. No. 13/859,916 to Hiroshi Nomura et al., filed Apr. 10, 2013.
U.S. Appl. No. 13/239,909 to Isao Okuda, filed Sep. 22, 2011.
U.S. Appl. No. 13/552,742 to Isao Okuda, filed Jul. 19, 2012.
U.S. Appl. No. 13/669,656 to Hiroshi Nomura, filed Nov. 6, 2012.
U.S. Appl. No. 14/032,792 to Hiroshi Nomura et al., filed Sep. 20, 2013.
U.S. Appl. No. 14/032,775 to Hiroshi Nomura et al., filed Sep. 20, 2013.

* cited by examiner

*Primary Examiner* — Rochelle-Ann J Blackman
(74) *Attorney, Agent, or Firm* — Greenblum & Bernstein, P.L.C.

(57) ABSTRACT

An electrical drive device for a bending photographing optical system, the bending photographing optical system including a movable optical element that is movable in an optical axis direction and a reflection optical element positioned on the optical axis, the electrical drive device includes a motor provided with a leadscrew which extends therefrom in a direction parallel to the optical axis and drives the movable optical element to move in a direction of the optical axis. The leadscrew includes a threaded portion which screw-engages with a nut member provided on the movable optical element, and a small-diameter portion having a smaller diameter than that of the threaded portion, the small-diameter portion being positioned beside a side surface of the reflection optical element.

5 Claims, 5 Drawing Sheets

G1
41b (41b1)
33
34c
34b
34
41b2
G3
G4
L12d
41(41a)
G2
L12
42b (42b1)
33c
33b
42b2
L12d
42(42a)

ELECTRICAL DRIVE DEVICE FOR BENDING PHOTOGRAPHING OPTICAL SYSTEM

BACKGROUND OF THE INVENTION

1. Field of the Invention

The present invention relates to an electrical drive device which is provided for a bending photographing optical system and which electrically drives at least one optical element of the bending photographing optical system.

2. Description of the Related Art

In order to slim down an imaging apparatus, a bending photographing optical system which provides a prism(s), which bends the optical axis, in the optical path of the photographing optical system, is known in the art. Furthermore, photographing apparatuses which electrically drive an optical element (typically a lens element) positioned in the optical path in order to perform a focusing operation and/or a zooming operation have also become well-known in the art.

In an imaging apparatus which is provided with such a bending photographing optical system and which electrically drives an optical element that is provided in the optical path thereof, in order to achieve further miniaturization, it has been proposed in Japanese Unexamined Patent Publication No. 2007-121494 to provide an electrical drive motor behind (at the other side of) the reflection surface of the prism (namely, at a position overlapping the reflection surface when viewing the reflection surface in a direction along the incident light-rays/exit light-rays).

In the above-mentioned Japanese Unexamined Patent Publication No. 2007-121494, by providing the electrical drive motor behind (at the other side of) the reflection surface of the prism, a certain degree of miniaturization of the imaging apparatus can be achieved. However, according to the inventors of the present invention, the miniaturization achieved in the above-mentioned Japanese Unexamined Patent Publication is insufficient, especially in regard to the reduction in the width in a direction orthogonal to the direction of the optical axis (i.e., the width in a direction orthogonal to a plane on which the incident optical axis and the exit optical axis of the prism lie) of the bending photographing optical system.

SUMMARY OF THE INVENTION

The present invention has been devised in view of the above mentioned drawbacks and provides an electrical drive device which enables as much miniaturization of an imaging apparatus as possible in the width thereof in a direction orthogonal to the optical axis of the bending photographing optical system.

According to an aspect of the present invention, an electrical drive device for a bending photographing optical system is provided, the bending photographing optical system including a movable optical element that is movable in an optical axis direction and a reflection optical element positioned on the optical axis, the electrical drive device including a motor provided with a leadscrew which extends therefrom in a direction parallel to the optical axis and drives the movable optical element to move in a direction of the optical axis. The leadscrew includes a threaded portion which screw-engages with a nut member provided on the movable optical element, and a small-diameter portion having a smaller diameter than that of the threaded portion, the small-diameter portion being positioned beside a side surface of the reflection optical element.

The 'side surface' of the reflection optical member refers to the side surface other than the incident surface, the exit surface and the reflection surface.

It is desirable for part of the motor to be positioned behind the reflection surface of the reflection optical element so that the motor overlaps the reflection surface as viewed in the direction of said optical axis.

It is practical for the small-diameter portion of the leadscrew to include a non-threaded portion.

It is desirable for the small-diameter portion of the leadscrew member to be provided proximal to the motor.

It is desirable for the leadscrew to be positioned close to the reflection optical element such that, when viewed in the axial direction of the leadscrew, the threaded portion of the leadscrew overlaps, or borders on, a side surface of the reflection optical element.

It is desirable for a pair of motors having a pair of leadscrews which drive a pair of movable optical elements, respectively, to be provided on respective side surfaces of the reflection optical element.

According to the present invention, in a bending photographing optical system provided with a movable optical element that moves along the optical axis and a reflection optical element provided on the optical axis, and an electrical drive device provided with a motor having a leadscrew that is parallel to the optical axis and drives the movable optical element, since the leadscrew is provided with a male threaded portion that is screw-engaged with a nut member of the movable optical element, and a small-diameter portion, having a smaller diameter than that of the male threaded portion, which is positioned at the side surface of the reflection optical element, it is possible to position the leadscrew very close to the reflection optical element, thereby achieving further (widthwise) miniaturization in a direction orthogonal to the optical axis direction.

The present disclosure relates to subject matter contained in Japanese Patent Application No. 2013-016628 (filed on Jan. 31, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENTS

Figure 1:
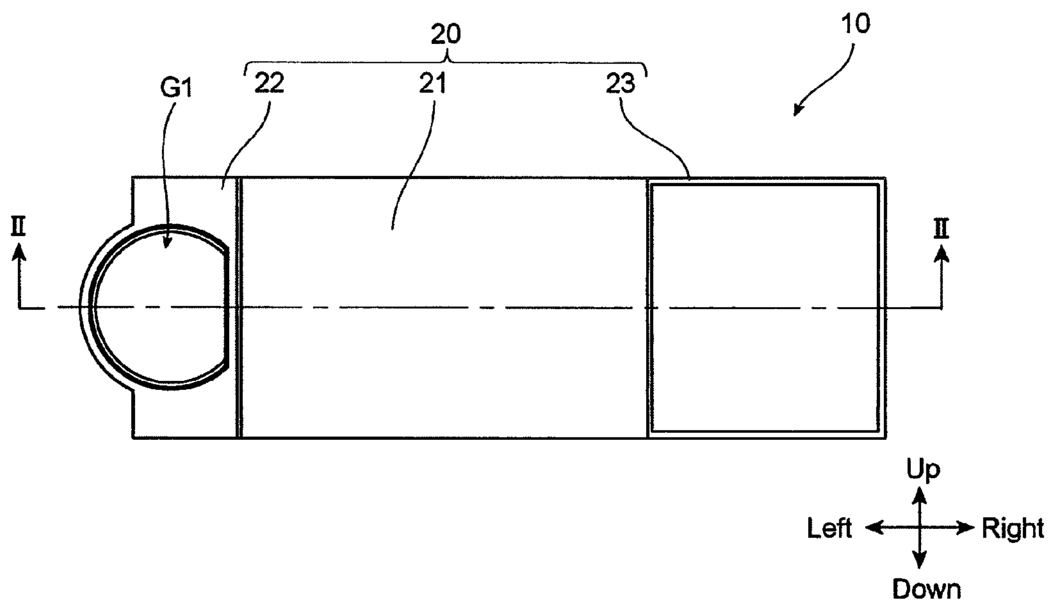
FIG. 1 is a plan view showing an embodiment of an imaging unit, to which the electrical drive device for a bending photographing optical system of the present invention is applied.

An embodiment of an imaging unit (imaging apparatus) 10 according to the present invention will be discussed hereinafter. In the following descriptions, forward and rearward directions, leftward and rightward directions, and upward and downward directions with respect to the imaging unit 10 are determined with reference to the directions of the double-headed arrows shown in the drawings. The object side corresponds to the front side (forward direction). As shown by the outward appearance of the imaging unit 10 in the drawings, the imaging unit 10 has a laterally elongated shape which is slim in the forward/rearward direction and long in the leftward/rightward direction. The widthwise miniaturization, which is the subject of the problem to be solved by the present invention, refers to the reduction in the width in the upward/downward direction of the imaging unit 10. Furthermore, in the following descriptions of the optical positional-relationship, the optical axis direction refers to the forward/rearward direction, the object side being the forward direction and the image side being the rearward direction.

Figure 2:
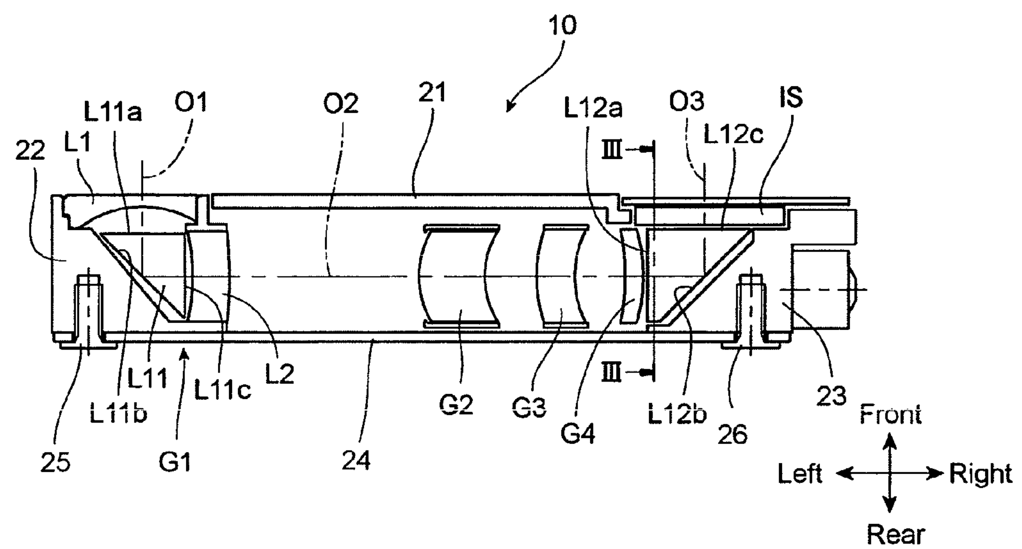
FIG. 2 is a cross-sectional view taken along the line II-II shown in FIG. 1.

As shown in FIG. 2, the imaging optical system of the imaging unit 10 is provided with a negative first lens group (front lens group) G1, a positive second lens group (rear lens group/movable optical element) G2, a positive third lens group (rear lens group/movable optical element) G3, a positive stationary lens group G4, and a second prism (reflection optical element) L12, in that order along the optical path from the object side. A first prism (reflection optical element) L11 is provided in the first lens group G1 and the second prism L12 is positioned behind (on the image side of) the stationary lens group G4 so that the imaging optical system of the imaging unit 10 is configured as a bending photographing optical system which reflects (bends) light rays at substantially right angles at each of the first prism L11 and the second prism L12. Namely, in the bending photographing optical system of the imaging unit 10, a first optical axis O1 passes through an incident surface L11*a* and extends to the reflection surface L11*b* of the first prism L11; a second optical axis O2 reflects from the reflection surface L11*b*, exits from the exit surface L11*c*, passes through the second lens group G2, the third lens group G3 and the stationary lens group G4, and passes through an incident surface L12*a* of the second prism L12 and is incident on a reflection surface L12*b* of the second prism L12; and a third optical axis O3 reflects from the reflection surface L12*b* and exits from an exit surface L12*c* of the second prism L12 and is incident on an image sensor IS; furthermore, the first optical axis O1, the second optical axis O2 and the third optical axis O3 lie on a common plane. The first lens group G1 is configured of a first lens element L1 provided in front (on the object side) of the incident surface L11*a* of the first prism L11, the first prism L11, and a second lens element L2 provided behind (on the image side of) the exit surface L11*c* of the first prism L11.

Each of the above-described optical elements of the imaging optical system (bending photographing optical system) is supported in a housing 20. The housing 20 is provided with a main housing 21 and a first-lens-group housing 22. A pair of guide rods 31 and 32, which guide the second lens group G2 and the third lens group G3, are supported in the main housing 21. The first lens group G1 is supported in the first-lens-group housing 22, and the second prism L12 and the stationary lens group G4 are supported in a prism-housing unit 23 of the main housing 21. A motor flange 24 is fixed to the first-lens-group housing 22 and the prism-housing unit 23 by fixing screws 25 and 26, respectively (see FIG. 2). The motor flange 24 is a plate member that is elongated in the leftward/rightward direction and extends to the rearward side of the first-lens-group housing 22. Furthermore, although not indicated in the drawings, the upper and lower sides of the imaging unit 10 are covered by walls of the main housing 21, and the gaps and holes of the motor flange 24 are covered by a separate member such as an external plate member or light-shielding tape, etc.

The second lens group G2 and the third lens group G3 are supported by lens frames 33 and 34, respectively. The lens frames 33 and 34 are respectively provided with guide cylinders (guide holes) 33*a* and 34*a*, through which a pair of upper and lower guide rods 31 and 32 are slidably fitted so that the lens frames 33 and 34 are respectively movably-guided along the pair of guide rods 31 and 32 via the guide cylinders (guide holes) 33*a* and 34*a*.

Figure 6:
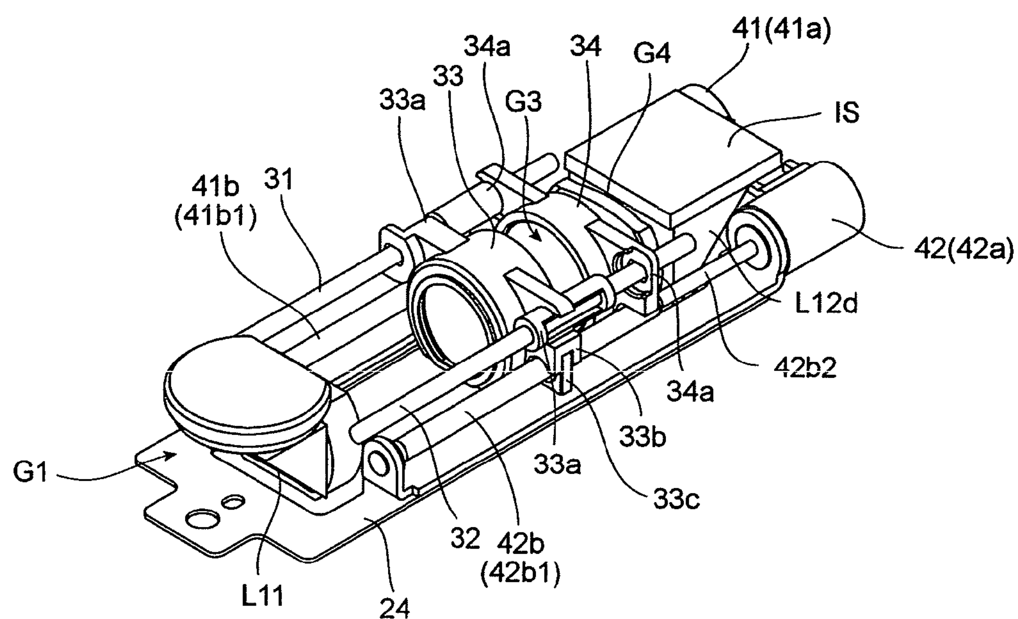
FIG. 6 shows a perspective view of the members shown in FIG. 5 and further shows a motor flange.

A pair of leadscrew-integrated motors 41 and 42 which linearly move the second lens group G2 and the third lens group G3 in the optical axis (second optical axis O2) direction are supported on the housing 20 (the motor flange 24) (see FIG. 6). The leadscrew-integrated motors 41 and 42 are provided with leadscrews 41*b* and 42*b* that directly constitute the rotational shafts (i.e., with no reduction mechanism provided therebetween) of the motor bodies 41*a* and 42*a*, respectively. The leadscrews 41*b* and 42*b* of the leadscrew-integrated motors 41 and 42 are respectively provided parallel to the pair of guide rods 31 and 32 and are positioned away from the pair of guide rods 31 and 32 by a predetermined distance.

Figure 5:
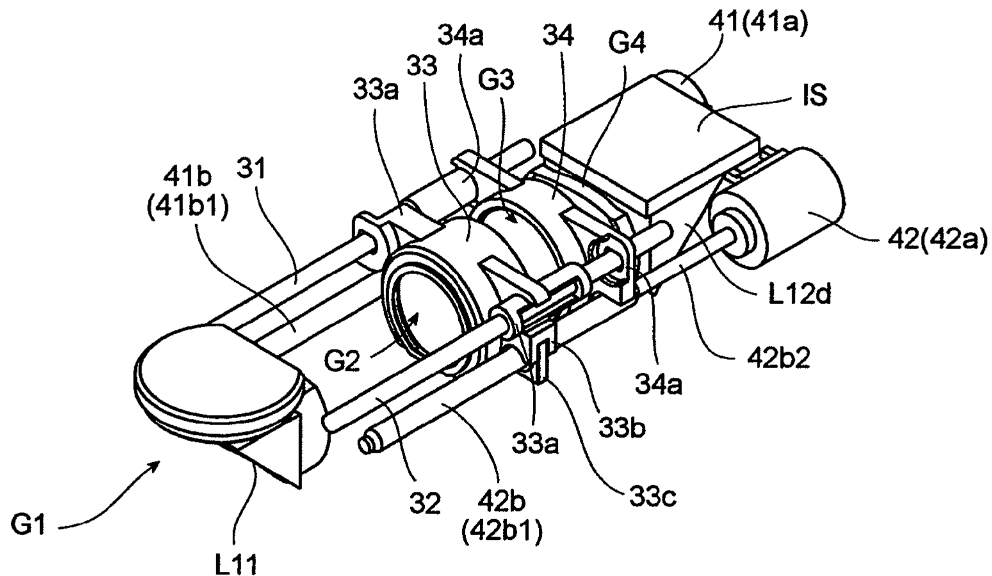
FIG. 5 shows a perspective view of the members shown in FIG. 4, further combined with a pair of motors and respective leadscrews for the movable second lens group and the movable third lens group.
Figure 7:
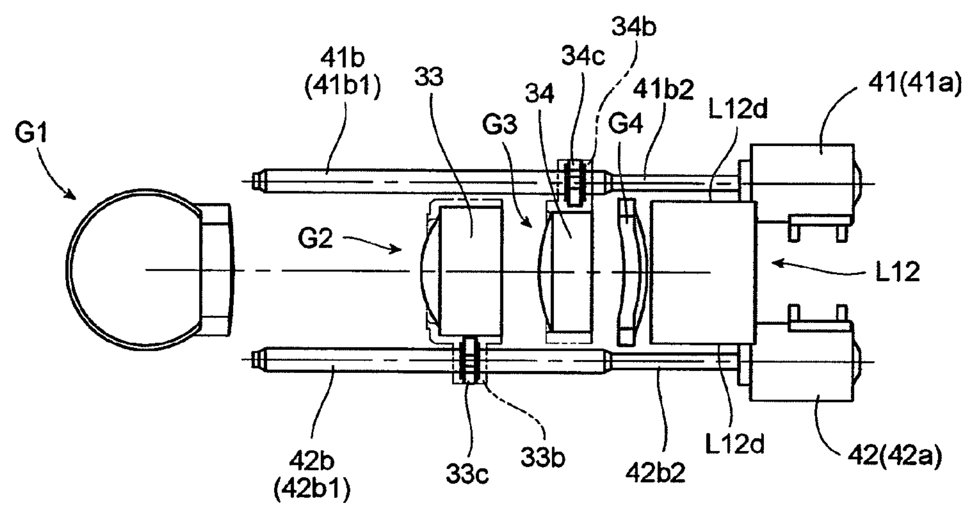
FIG. 7 shows a plan view of FIG. 5.
Figure 8:
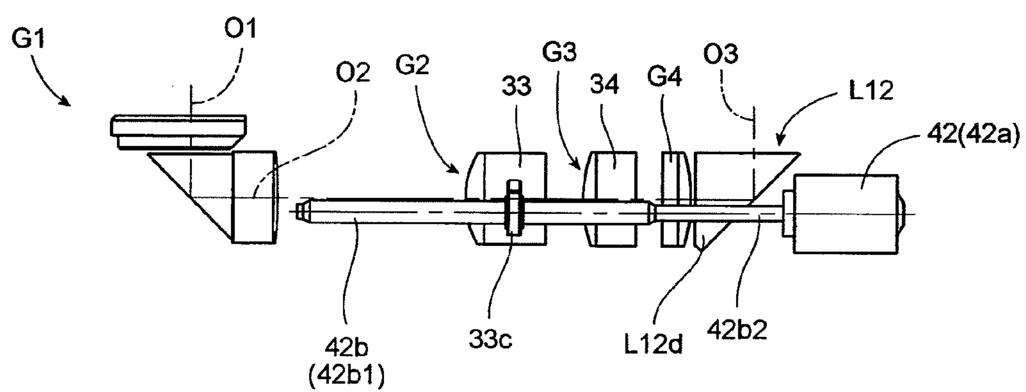
FIG. 8 shows a side elevational view of FIG. 5.

The leadscrews 41*b* and 42*b* are provided with small-diameter portions (narrow-diameter portions) 41*b*2 and 42*b*2 proximal to the motor bodies 41*a* and 42*a*, respectively, and threaded portions 41*b*1 and 42*b*1 distant from the motor bodies 41*a* and 42*a*; the threaded portions 41*b*1 and 42*b*1 and the small-diameter portions 41*b*2 and 42*b*2 are coaxial with each other. The lens frame 34 is provided with a bifurcated member 34*b*, through which the threaded portion 41*b*1 is inserted. The threaded portion 41*b*1 is screw-engaged with a nut member 34*c*, which is inserted into the bifurcated member 34*b* with a minimum clearance therebetween (see FIG. 7). Similarly, the lens frame 33 is provided with a bifurcated member 33*b*, through which the threaded portion 42*b*1 is inserted. The threaded portion 42*b*1 is screw-engaged with a nut member 33*c*, which is inserted into the bifurcated member 33*b* with a minimum clearance therebetween (see FIGS. 5 through 7). Accordingly, when the leadscrew 41*b* (threaded portion 41*b*1) is driven (rotated) forwardly/reversibly, the lens frame 34 (third lens group G3) is moved in the forward/reverse directions in the direction of the second optical axis O2. Similarly, when the leadscrew 42*b* (threaded portion 42*b*1) is driven (rotated) forwardly/reversibly, the lens frame 33 (second lens group G2) is moved in the forward/reverse directions in the direction of the second optical axis O2. The leadscrew-integrated motors 41 and 42 are driven (rotated) based on focal-length information and photographic-distance information; a detailed explanation on the control of the leadscrew-integrated motors 41 and 42 is herein omitted.

The small-diameter portions 41*b*2 and 42*b*2 of the leadscrews 41*b* and 42*b* are respectively formed as non-threaded portions (simple cylindrical columnar portions) and are smaller in diameter than the threaded portions 41*b*1 and 42*b*1. Therefore, in the illustrated embodiment, the leadscrews 41*b* and 42*b* can be positioned closer to the respective side surfaces L12*d* of the second prism L12 by a distance defined by the difference in diameters between the small-diameter portions 41*b*2 and 42*b*2 and the threaded portions 41*b*1 and 42*b*1, respectively. Accordingly, widthwise miniaturization in the upward/downward direction of the imaging unit 10 (in a direction orthogonal to a plane on which the second optical axis O2 and the third optical axis O3 lie, at the second prism L12 side) can be achieved (see FIGS. 1, 3 and 7). The side surfaces L12*d* of the second prism L12 refer to the side surfaces other than the incident surface L12*a*, the reflection surface L12*b* and the exit surface L12*c* (i.e., the pair of outer surfaces that are parallel to a plane lying on the second optical axis O2 and the third optical axis O3). Each of the leadscrews 41*b* and 42*b* can be formed from, e.g., a rod member having a large-diameter portion, on which the corresponding threaded portion 41*b*1 or 42*b*1 is to be formed, and a small-diameter portion, on which the corresponding small-diameter portion 41*b*2 or 42*b*2 is to be formed; the threaded portions 41*b*1 and 42*b*1 can be thread rolled on the respective large-diameter portions of the rod members.

Figure 3:
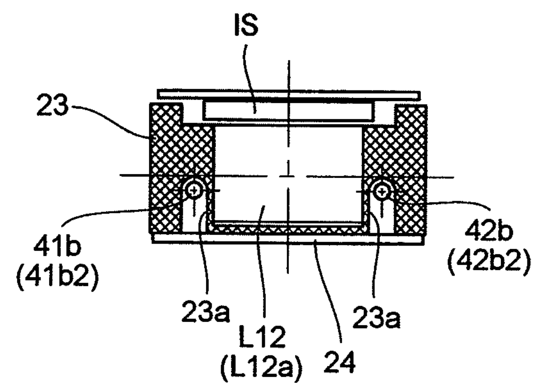
FIG. 3 is a cross-sectional view taken along the line shown in FIG. 2.
Figure 4:
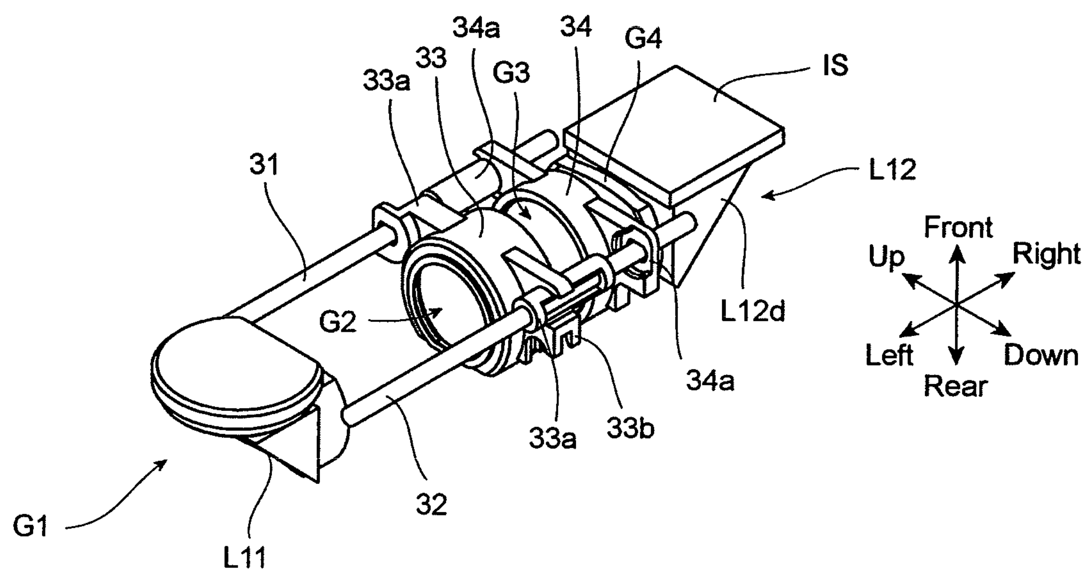
FIG. 4 shows a perspective view of a first lens group (optical-member group), a movable second lens group, a movable third lens group, a prism, an image sensor and guide shafts, for the second and third movable lens groups, of the imaging unit.
Figure 9:
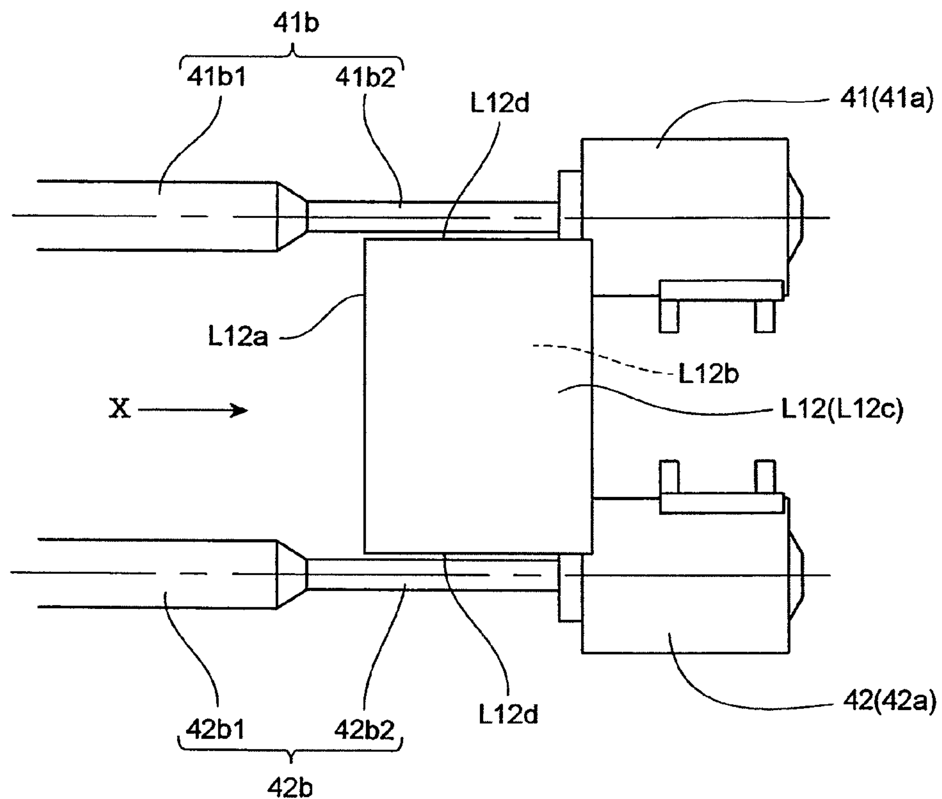
FIG. 9 shows an enlarged plan view of the relationship between the prism, the pair of motors and the respective leadscrews.
Figure 10:
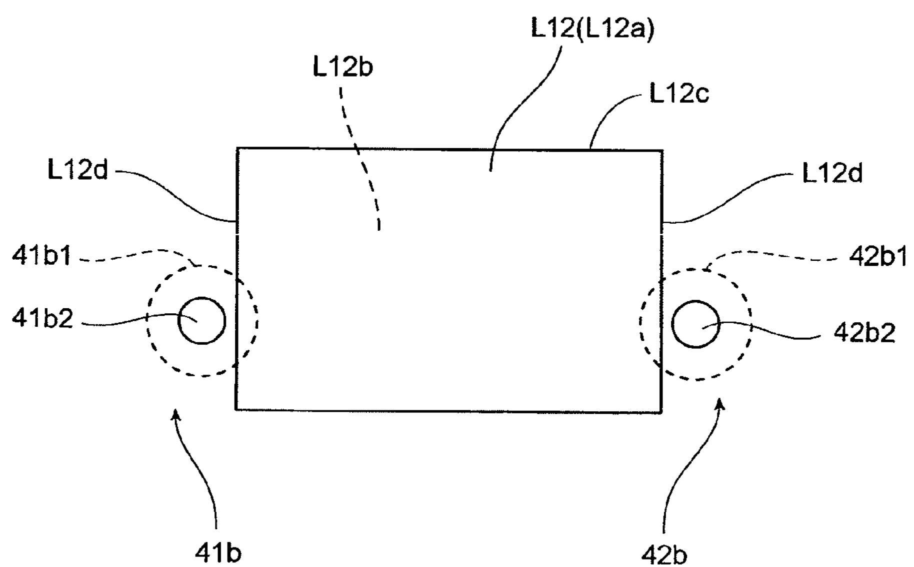
FIG. 10 is a view along the arrow X of FIG. 9.

FIGS. 9 and 10 show enlarged views which show that the leadscrews 41*b* and 42*b* can be respectively positioned close to the side surfaces L12*d* of the second prism L12. Specifically, the extent by which the leadscrews 41*b* and 42*b* are respectively positioned close to the side surfaces L12*d* is such that, when viewed in the axial direction of the leadscrews 41*b* and 42*b* (when viewed in the direction 'X' indicated in FIG. 9), the threaded portions 41*b*1 and 42*b*1 overlap (interfere) with (as shown in FIG. 10), or border on, the side surface L12*d* of the second prism L12. As shown in FIG. 3, the small-diameter portions 41*b*2 and 42*b*2 of the leadscrews 41*b* and 42*b* are respectively positioned inside relief recesses 23*a* formed in the prism-housing unit 23 in a non-contact state.

Furthermore, part of each of the motor bodies 41*a* and 42*a* of the leadscrew-integrated motors 41 and 42 is positioned behind the reflection surface L12*b* of the second prism L12 (see FIG. 7) (so that the motor bodies 41*a* and 42*a* overlap the reflection surface L12*b*) when viewed in the forward direction along the second optical axis O2. Also, part of each of the motor bodies 41*a* and 42*a* is positioned behind the exit surface L12*c* (so that the motor bodies 41*a* and 42*a* overlap the exit surface L12*c*) when viewed in the rearward direction along the third optical axis O3. Due to this positional relationship between the second prism L12 and the motor bodies 41*a* and 42*a*, miniaturization of the imaging unit 10 in the leftward/rightward direction can also be achieved.

The second prism L12 can be formed by injection molding using a resin material. In the case where the second prism L12 is a molded product formed from a resin material, a draft needs to be set for when the respective side surfaces L12*d* and L12*d* are molded. For example, when the incident surface L12*a* is viewed in the direction of the second optical axis O2 (see FIG. 3), the respective side surfaces L12*d* and L12*d* are set on an incline so that the lower side (edge) of the incident surface L12*a* is shorter than the upper side (edge) (opposite to the lower side) that contacts the side (edge) of the exit surface L12*c* (so that the incident surface L12*a* has upside-down trapezoidal shape). In such a case, the side surfaces L12*d* and L12*d* are not parallel to the second optical axis O2 or the third optical axis O3.

In the above-described embodiment, the leadscrews 41*b* and 42*b* are respectively provided with the small-diameter portions 41*b*2 and 42*b*2, however, it is possible to provide a small-diameter portion on only one of the leadscrews 41*b* and 42*b*, and to provide the leadscrew (41*b* or 42*b*) that is provided with the small-diameter portion at a closer position to the side surface of the second prism L12 compared to the position of the other leadscrew (42*b* or 41*b*).

Although, in the above-described embodiment, the present invention has been applied to a bending photographing optical system provided with two movable lens groups, i.e., the second lens group G2 and the third lens group G3, the present invention can also be applied to a bending photographing optical system that is provided with only one movable lens group that is driven by an electrical drive device (e.g., a bending photographing optical system that is not provided with a zooming function in which only a focusing lens group is driven (moved in the optical axis direction) by an electrical drive device).

In the present invention, a configuration is also possible in which the leadscrew-integrated motors 41 and 42 are provided beside the first lens group G1, and the small-diameter portions 41*b*2 and 42*b*2 of the leadscrews 41*b* and 42*b* are positioned close to the respective side surfaces of the first prism L11. The configuration of the first lens group G1 of the above-described embodiment is merely an example configuration, and an alternative configuration of the first lens group G1 in which the first prism L11 is not included is also possible. The present invention can be applied to a bending photographing optical system in which the first prism L11 of the first lens group G1 has an opposite reflecting direction, and also can be applied to a bending photographing optical system in which the first prism L11 is not provided in the first lens group G1. Alternatively, the present invention can be applied to a bending photographing optical system in which the second prism L12 is not provided (in which only the first prism L11 is provided). Furthermore, the small-diameter portions 41*b*2 and 42*b*2 of the leadscrews 41*b* and 42*b* can be respectively formed as threaded portions instead of the non-threaded portions of the illustrated embodiment.

Furthermore, although the imaging optical system (bending photographing optical system) of the above-described embodiment uses prisms as reflection optical elements for bending the optical path, it is also possible to use at least one mirror instead of a prism(s) as a reflection optical element. Moreover, the bending angle (reflection angle) of the optical axis (optical path) by the reflection surfaces (L11*b* and L12*b*) can be an angle other than 90 degrees.

Furthermore, in the above-described embodiment, the incident surface L12*a* of the second prism L12 has a horizontally-long rectangular shape as viewed in a direction of the normal (second optical axis O2) to the incident surface L12*a*, however, the present invention can be applied to an imaging apparatus (bending photographing optical system) in which the shape of the incident surface of the second prism L12 can be square, trapezoidal or any other shape, as viewed in the direction of the normal (second optical axis O2) to the incident surface.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electrical drive device for a bending photographing optical system, said bending photographing optical system including a movable optical element that is movable in an optical axis direction and a reflection optical element positioned on said optical axis, said electrical drive device comprising:

a motor provided with a leadscrew which extends therefrom in a direction parallel to said optical axis and drives said movable optical element to move in a direction of said optical axis, wherein said leadscrew includes a threaded portion which screw-engages with a nut member provided on said movable optical element, and a small-diameter portion having a smaller diameter than that of said threaded portion, said small-diameter portion being positioned beside a side surface of said reflection optical element, and wherein part of said motor is positioned behind said reflection surface of said reflection optical element so that said motor overlaps said reflection surface as viewed in the direction of said optical axis.

2. The electrical drive device for a bending photographing optical system according to claim 1, wherein said small-diameter portion of said leadscrew includes a non-threaded portion.

3. The electrical drive device for a bending photographing optical system according to claim 1, wherein said small-diameter portion of said leadscrew member is provided proximal to said motor.

4. The electrical drive device for a bending photographing optical system according to claim 1, wherein said leadscrew is positioned close to said reflection optical element such that, when viewed in the axial direction of said leadscrew, said threaded portion of said leadscrew overlaps, or borders on, a side surface of said reflection optical element.

5. The electrical drive device for a bending photographing optical system according to claim 1, wherein a pair of said motors having a pair of said leadscrews which drive a pair of said movable optical elements, respectively, are provided on respective side surfaces of said reflection optical element.

* * * * *